US008043425B2

(12) United States Patent
Garcia

(10) Patent No.: US 8,043,425 B2
(45) Date of Patent: Oct. 25, 2011

(54) CONCRETE WITH A LOW CEMENT CONTENT

(75) Inventor: Emmanuel Garcia, Saint-Didier de la Tour (FR)

(73) Assignee: Lafarge, Paris (FR)

( * ) Notice: Subject to any disclaimer, the term of this patent is extended or adjusted under 35 U.S.C. 154(b) by 1119 days.

(21) Appl. No.: 11/749,352

(22) Filed: May 16, 2007

(65) Prior Publication Data

US 2007/0266906 A1  Nov. 22, 2007

(30) Foreign Application Priority Data

May 17, 2006 (FR) ..................................... 06 04 398

(51) Int. Cl.
C04B 7/02 (2006.01)

(52) U.S. Cl. ........ 106/713; 106/705; 106/737; 106/738; 106/DIG. 1; 264/333; 264/DIG. 43

(58) Field of Classification Search .................. 106/713, 106/737, 705, DIG. 1, 738; 264/333
See application file for complete search history.

(56) References Cited

U.S. PATENT DOCUMENTS 6,723,162 B1 * 4/2004 Cheyrezy et al. ............. 106/644

FOREIGN PATENT DOCUMENTS

| EP | 0 010 777 A1 | 5/1980 |
| EP | 0 518 777 A1 | 12/1992 |
| EP | 0 934 915 A1 | 8/1999 |
| GB | 2 293 376 A | 3/1996 |
| GB | 2 377 930 A | 1/2003 |
| JP | 09-194247 A | 7/1997 |
| JP | 2000-128618 | 5/2000 |
| WO | WO 93/21122 A1 | 10/1993 |
| WO | WO 95/01316 A1 | 1/1995 |
| WO | WO 95/01317 A1 | 1/1995 |
| WO | WO 99/23046 A1 | 5/1999 |
| WO | WO 99/28267 A1 | 6/1999 |
| WO | WO 99/58468 A1 | 11/1999 |
| WO | WO 01/58826 A1 | 8/2001 |

OTHER PUBLICATIONS

French Search Report for French Application No. 0604398, dated Jan. 5, 2007.

* cited by examiner

*Primary Examiner* — Paul Marcantoni
(74) *Attorney, Agent, or Firm* — Pillsbury Winthrop Shaw Pittman, LLP

(57) ABSTRACT

A subject of the invention is a mixture comprising in proportions by mass:
from 0.4 to 4%, preferably from 0.8 to 1.7%, of materials in the ultrafine particle size range, constituted by particles with a D90 smaller than 1 μm and/or with a specific BET surface area greater than 6 m$^2$/g;
from 1 to 6%, preferably from 2 to 5%, of Portland cement;
from 8 to 25%, preferably from 12 to 21%, of materials in the fine particle size range, constituted by particles the D10 and the D90 of which are comprised between 1 μm and 100 μm and with a specific BET surface area of less than 5 m$^2$/g, different from the cement;
from 25 to 50%, preferably from 30 to 42%, of materials in the medium particle size range, constituted by particles the D10 and the D90 of which are comprised between 100 μm and 5 mm; and
from 25 to 55%, preferably from 35 to 47%, of materials in the larger particle size range, constituted by particles the D10 of which is greater than 5 mm.
The invention also relates in particular to premixes, concrete compositions and associated objects made of hardened concrete, as well as their preparation methods.

17 Claims, 4 Drawing Sheets

CONCRETE WITH A LOW CEMENT CONTENT

CROSS REFERENCE TO RELATED APPLICATIONS

This application is based upon and claims the benefit of priority from French Patent Application No. 06 04 398, filed May 17, 2006, the entire contents of which are incorporated herein by reference.

FIELD OF THE INVENTION

The invention relates to a concrete with a low Portland cement content, as well as methods for preparing such a concrete and compositions useful for the implementation of these methods.

TECHNICAL BACKGROUND

Technological developments in the field of concretes in the last few years have led to the development of innovative cement formulations making it possible to obtain ultra-high-performance concretes in terms in particular of compressive strength. These formulations generally involve the use of further materials in addition to cement and aggregates and/or sand, for example fibers, organic additives or so-called ultrafine particles which are generally smaller than cement grains.

For example the document EP 0518777 describes a mortar composition comprising, apart from Portland cement: sand with a diameter comprised between 80 µm and 1 mm (in particular between 125 and 500 µm), vitreous microsilica with a diameter comprised between 0.1 and 0.5 µm and a water-reducing or plasticizing agent. The microsilica represents only 10 to 30% by weight relative to the cement.

The document WO 95/01316 describes a composition for concrete comprising, besides Portland cement: sand with a diameter of 150 to 400 µm, fine elements with pozzolanic reaction (in particular amorphous silica but also fly ash or blast furnace slag) with a diameter of less than 0.5 µm, a small quantity of metal fibers and optionally ground quartz powder (average size 10 µm) and small quantities of other additives. The amorphous silica can be present in a proportion of 10 to 40% by weight relative to the cement, and the ground quartz powder, when it is used, is typically present in a proportion of 40% by weight relative to the cement. The composition for concrete according to this document therefore requires approximately 900 kg of cement per m³ of concrete.

In the document WO 95/01317, a composition for concrete very similar to the preceding one is disclosed, with exclusively steel wool as metal fibers and amorphous silica as elements with pozzolanic reaction.

The cement compositions described in the document WO 99/23046 are more specifically dedicated to the cementing of wells and, besides a hydraulic binder, comprise: 20 to 35% by weight relative to the binder of microsilica with a grain size comprised between 0.1 and 50 µm, and 20 to 35% by weight relative to the binder of mineral or organic particles with a diameter comprised between 0.5 and 200 µm, as well as a superplasticizer or plasticizer.

The document WO 99/28267 relates to a concrete composition comprising cement and metal fibers as well as: 20 to 60% by weight relative to the cement matrix of sieved or ground sand-type granular elements smaller than 6 mm; elements with pozzolanic reaction smaller than 1 µm; acicular or flaky elements smaller than 1 mm; and a dispersing agent. In the examples, the elements with pozzolanic reaction are constituted by vitreous silica in a proportion of approximately 30% by weight relative to the Portland cement.

In a relatively similar manner, the document WO 99/58468 describes a concrete composition in which there are included at least: a small quantity of organic fibers, granular elements smaller than 2 mm, fine elements with pozzolanic reaction smaller than 20 µm and at least one dispersing agent. In the different examples mentioned, the composition comprises approximately 30% of quartz flour and approximately 30% by weight of silica fume relative to the cement.

These proportions between the different particle size ranges are not fundamentally modified in a later document (WO 01/58826) also disclosing other concrete compositions.

The document EP 0934 915 describes a concrete prepared from cement the grains of which have an average diameter comprised between 3 and 7 µm, to which are added: sand, silica fume with a characteristic diameter of less than 1 µm, an antifoaming agent and a superplasticizer, such that at least three particle size ranges are represented. In the light of the different examples, it is noted that the silica fume is in the minority relative to the cement, the latter typically being present in a proportion of approximately 900 kg per m³ of concrete.

Analysis of the prior art shows:
1) that the optimization of the formulations is specifically directed towards the high or ultra-high-performance concretes and does not apply generally to the concretes in common use; and
2) that all the currently known concretes have a relatively high cement content.

Thus, even if the standard concretes, which have less good performances in terms of compressive strength than the abovementioned concretes, for example the B25-type concretes (i.e. the compressive strength of which 28 days after mixing is at least 25 MPa) are examined, it is noted that the quantity of cement is typically 260 to 360 kg per m³ of concrete. Moreover, the current European standards do not provide cement levels of less than 260 kg/m³ for concretes in common use.

Now, the methods for producing cement, and more particularly its prime constituent, clinker, give rise to significant carbon dioxide emissions. The production of clinker grains in fact assumes:
  a) the preheating and the decarbonation of the raw meal which is obtained by grinding the raw materials, which are in particular limestone and clay; and
  b) the firing or clinkering of the meal at a temperature of 1500° C., followed by rapid cooling.

These two stages produce $CO_2$, on the one hand as a direct product of decarbonation and on the other hand as a by-product of the combustion which is implemented in the firing stage in order to raise the temperature.

The emission level therefore reaches a minimum of approximately 560 kg of $CO_2$ per tonne of binder for a standard B25 concrete (based on 850 kg of $CO_2$ emitted on average per tonne of cement), and it is still greater for a ultra-high performance concrete.

The significant carbon dioxide emissions in the standard methods for producing cement compositions and concrete constitute a major environmental problem, and, in the present context, are subject to significant economic penalties.

A strong need therefore exists for a method making it possible to produce concrete with reduced associated carbon dioxide emissions, said concrete exhibiting satisfactory mechanical properties, in particular equivalent to those of the existing concretes in common use, with a view to its use in the construction industry.

SUMMARY OF THE INVENTION

A subject of the invention is therefore a mixture comprising in proportions by mass:
- from 0.4 to 4%, preferably from 0.8 to 1.7%, of materials in the ultrafine particle size range, constituted by particles with a D90 smaller than 1 μm and/or with a specific BET surface area greater than 6 m$^2$/g;
- from 1 to 6%, preferably from 2 to 5%, of Portland cement;
- from 8 to 25%, preferably from 12 to 21%, of materials in the fine particle size range, constituted by particles the D10 and the D90 of which are comprised between 1 μm and 100 μm and with a specific BET surface area of less than 5 m$^2$/g, different from the cement;
- from 25 to 50%, preferably from 30 to 42%, of materials in the medium particle size range, constituted by particles the D10 and the D90 of which are comprised between 100 μm and 5 mm; and
- from 25 to 55%, preferably from 35 to 47%, of materials in the larger particle size range, constituted by particles the D10 of which is greater than 5 mm.

The invention also relates to a binder premix comprising:
- Portland cement;
- a fine particle size range as defined above; and
- an ultrafine particle size range as defined above;
- in which the proportion by mass of Portland cement in the premix is less than 50% and preferably from 5 to 35%, in a more particularly preferred manner from 10 to 25%.

Advantageously, the proportion by mass of the ultrafine particle size range in said binder premix is from 2 to 20%, preferably from 5 to 10%.

Advantageously, the binder premix according to the invention, comprises in proportions by mass:
- from 5 to 35% preferably from 10 to 25%, of Portland cement;
- from 60 to 90%, preferably from 65 to 85%, of materials in the fine particle size range, and
- from 2 to 20%, preferably from 5 to 10%, of materials in the ultrafine particle size range.

According to an advantageous embodiment of the mixture or binder premix according to the invention, the ultrafine particle size range is constituted by materials chosen from the group composed of silica fume, limestone powder, precipitated silica, precipitated carbonate, pyrogenated silica, natural pozzolan, pumice stone, ground fly ash, hydrated or carbonated siliceous hydraulic binder grind, and mixtures or co-grinds thereof, in dry form or aqueous suspension.

According to a particular embodiment of the mixture or binder premix according to the invention, the mixture (Portland cement and fine particle size range) is composed of:
- a first particle size sub-range, constituted by particles the D10 and the D90 of which are comprised between 1 and 10 μm; and
- a second particle size sub-range, constituted by particles the D10 and the D90 of which are comprised between 10 and 100 μm;
and in which the first particle size sub-range comprises Portland cement.

According to an alternative embodiment of the mixture or binder premix according to the invention, the mixture (Portland cement and fine particle size range) is constituted by particles the D10 and the D90 of which are comprised between 1 and 20 μm.

According to an advantageous embodiment of the mixture or binder premix as defined above, the fine particle size range comprises one or more materials chosen from fly ash, pozzolanas, limestone powders, siliceous powders, lime, calcium sulfate, slag.

Advantageously, the mixture or premix as defined above comprises:
- Portland cement and fly ash; or
- Portland cement and limestone powder; or
- Portland cement and slag; or
- Portland cement, fly ash and limestone powder; or
- Portland cement, fly ash and slag; or
- Portland cement, limestone powder and slag; or
- Portland cement, fly ash, limestone powder and slag.

According to an embodiment, the mixture or binder premix comprises Portland cement and fly ash and does not comprise any slag.

According to an embodiment, the mixture or binder premix comprises Portland cement and slag and does not comprise any fly ash.

Advantageously, the mixture or binder premix as defined above also comprises:
- a plasticizer
- optionally an accelerator and/or an air-entraining agent and/or a thickening agent and/or a retarder.

According to an advantageous embodiment of the binder premix as defined above, the proportion of plasticizer is from 0.05 to 3%, preferably from 0.1 to 0.5% expressed as a mass ratio of dry extract of plasticizer to the mass of binder premix.

A subject of the invention is also a mixture comprising:
- a binder premix as defined above;
- a medium particle size range as defined above; and
- a larger particle size range as defined above.

Advantageously, said mixture comprises, in proportions by mass:
- from 10 to 35%, preferably from 15 to 25%, of binder premix;
- from 25 to 50%, preferably from 30 to 42%, of materials in the medium particle size range; and from 25 to 55%, preferably from 35 to 47%, of materials in the larger particle size range.

According to an advantageous embodiment of the above-mentioned mixture:
- the medium particle size range comprises sand and/or fine sand; and
- the larger particle size range comprises aggregates and/or gravel and/or pebbles and/or stone chippings.

According to an advantageous embodiment of the above-mentioned mixture, the spacing coefficient of the skeleton by the binder is from 0.5 to 1.3, preferably from 0.7 to 1.0.

The invention also relates to a wet concrete composition, comprising:
- a mixture according to the invention, mixed with water, Advantageously, said wet concrete composition comprises:
- from 10 to 100 kg/m$^3$, preferably from 20 to 40 kg/m$^3$ of materials in the ultrafine particle size range as defined above;
- from 25 to 150 kg/m$^3$, preferably from 50 to 120 kg/m$^3$, in a more particularly preferred manner, from 60 to 105 kg/m$^3$, of Portland cement;
- from 200 to 600 kg/m$^3$, preferably from 300 to 500 kg/m$^3$ of materials in the fine particle size range as defined above;

from 600 to 1200 kg/m³, preferably from 700 to 1000 kg/m³ of materials in the medium particle size range as defined above;

from 600 to 1300 kg/m³, preferably from 800 to 1100 kg/m³ of materials in the larger particle size range as defined above; and optionally, a plasticizer.

Advantageously, said wet concrete composition also comprises:

an accelerator and/or an air-entraining agent and/or a thickening agent and/or a retarder.

According to an advantageous embodiment of the wet concrete composition according to the invention, the W/C ratio, where W designates the quantity of water and C the quantity of Portland cement, is comprised between 1 and 2.5, preferably between 1.3 and 1.5. Other possible ranges for the W/C ratio are for example: between 1 and 1.3; between 1 and 1.5; between 1.3 and 2.5; and between 1.5 and 2.5.

According to an advantageous embodiment of the wet concrete composition according to the invention, the W/B ratio, where W designates the quantity of water and B the quantity of materials in the mixture (Portland cement and fine particle size range), is comprised between 0.1 and 0.45, preferably between 0.18 and 0.32. Other possible ranges for the W/B ratio are for example: between 0.1 and 0.18; between 0.1 and 0.32; between 0.18 and 0.45; and between 0.32 and 0.45.

The W/C and W/B ratios are notably adjusted as a function of the desired amount of cement and final mechanical properties. With a lower amount of cement, the ratio will be relatively lower as well. The skilled in the art, owing to routine testing, can determine the amount of water as a function of the amount of cement, fine and ultrafine particles of the composition, owing to compressive strength measurements on the samples.

Advantageously the wet concrete composition according to the invention comprises from 60 to 180 l/m³, preferably from 80 to 150 l/m³, in a more particularly preferred manner from 95 to 135 l/m³ of water.

According to an advantageous embodiment, the wet concrete composition according to the invention is a self-compacting concrete.

A subject of the invention is moreover a concrete composition comprising less than 150 kg/m³, preferably less than 120 kg/m³, in a more particularly preferred manner, from 60 to 105 kg/m³, of Portland cement and having a compressive strength greater than or equal to 4 MPa 16 hours after mixing, and greater than or equal to 25 MPa, preferably greater than or equal to 30 MPa, 28 days after mixing.

The invention also relates to an object made of hardened concrete of the composition defined above.

The invention also relates to an object made of hardened concrete, comprising:

from 10 to 100 kg/m³, preferably from 20 to 40 kg/m³ of materials in the ultrafine particle size range as defined above;

Portland cement hydrates in a quantity corresponding to a quantity of Portland cement of 25 to 150 kg/m³, preferably from 50 to 120 kg/m³, in a more particularly preferred manner, from 60 to 105 kg/m³;

from 200 to 600 kg/m³, preferably from 300 to 500 kg/m³ of materials in the fine particle size range as defined above;

from 600 to 1200 kg/m³, preferably from 700 to 1000 kg/m³ of materials in the medium particle size range as defined above;

from 600 to 1300 kg/m³, preferably from 800 to 1100 kg/m³ of materials in the larger particle size range as defined above.

According to an advantageous embodiment of the object made of hardened concrete according to the invention, the spacing coefficient of the skeleton by the binder is from 0.5 to 1.3, preferably from 0.7 to 1.0.

Advantageously, the object made of hardened concrete according to the invention exhibits shrinkage of less than 400 μm/m, preferably less than 200 μm/m, at 80 days.

The invention also relates to a method for the preparation of a wet concrete composition comprising a step of:

mixing a mixture according to the invention with water.

The invention also relates to a method for the preparation of a wet concrete composition comprising a step of:

mixing a binder premix according to the invention with materials in the medium particle size range as defined above, materials in the larger particle size range as defined above and water.

According to an embodiment of the method for the preparation of a wet concrete composition of the invention, the amount of Portland cement which is used is less than 150 kg/m³, preferably less than 120 kg/m³, most preferably between 60 and 105 kg/m³.

The invention also relates to a method for the preparation of a wet concrete composition comprising a step of mixing:

from 10 to 100 kg/m³, preferably from 20 to 40 kg/m³, of materials in the ultrafine particle size range as defined above;

from 25 to 150 kg/m³, preferably from 50 to 120 kg/m³, in a more particularly preferred manner, from 60 to 105 kg/m³ of Portland cement;

from 200 to 600 kg/m³, preferably from 300 to 500 kg/m³ of materials in the fine particle size range as defined above;

from 600 to 1200 kg/m³, preferably from 700 to 1000 kg/m³ of materials in the medium particle size range as defined above;

from 600 to 1300 kg/m³, preferably from 800 to 1100 kg/m³ of materials in the larger particle size range as defined above; and optionally, a plasticizer and/or an accelerator and/or an air-entraining agent and/or a thickening agent and/or a retarder; with water.

According to an advantageous embodiment of the method for the preparation of a wet concrete composition according to the invention, the mixing is carried out with a W/C ratio, where W designates the quantity of water and C the quantity of Portland cement, comprised between 1 and 2.5, preferably between 1.3 and 1.5.

According to an advantageous embodiment of the method for the preparation of a wet concrete composition according to the invention, the mixing is carried out with a W/B ratio comprised between 0.1 and 0.45, preferably between 0.18 and 0.32, where W designates the quantity of water and B the quantity of materials in the mixture (Portland cement and fine particle size range).

According to an advantageous embodiment of the method for the preparation of a wet concrete composition according to the invention, the quantity of water used is from 60 to 180 l/m³, preferably from 80 to 150 l/m³, in a more particularly preferred manner from 95 to 135 l/m³.

According to an embodiment of the method for the preparation of a wet concrete composition according to the invention, the compressive strength is greater than or equal to 4 MPa at 16 hours after mixing.

According to an embodiment of the method for the preparation of a wet concrete composition according to the invention, the compressive strength is greater than or equal to 25 MPa, preferably greater than 30 MPa at 28 days after mixing.

A subject of the invention is also a method for the preparation of a cast wet concrete, comprising a step of:
- casting a wet concrete composition according to the invention, or obtainable by the abovementioned method.

The invention also relates to a method for the production of a concrete object, comprising a step of:
- hardening a wet concrete composition according to the invention or obtainable by the method for preparation of an abovementioned wet concrete composition, or of a cast wet concrete composition as described above.

The invention makes it possible to meet the need for a reduction in $CO_2$ emissions, hitherto unsatisfied, by known concretes. In fact, the quantity of cement (and in particular of clinker) used within the framework of the present invention is less than that which is conventionally necessary. For example, for a formula according to the invention with 70 kg of clinker per $m^3$ of concrete, the $CO_2$ emission is of the order of 110 kg per tonne of binder, which represents a reduction of almost 80% in the $CO_2$ emission relative to a standard B25-type concrete, whilst not leading to any appreciable reduction in the mechanical performances of the concrete, since the invention provides a concrete having a mechanical compressive strength greater than or equal to 25 MPa 28 days after mixing.

The concrete obtained according to the invention also has the following advantages:
- its behavior vis-à-vis corrosion of the reinforcements of reinforced concrete is at least as good or even better relative to a standard B25-type concrete;
- its porosity and permeability are less than those of a standard B25-type concrete;
- its shrinkage is less than that of a standard B25-type concrete;
- its resistance to chloride diffusion is improved relative to a standard B25-type concrete.

The different purposes and advantages of the invention are obtained by means of full optimization of all of the formulation parameters, and in particular by means of:
- the development of binder compositions having a compartmentalization of the materials into separate particle size ranges, in particular into a fine range, a medium range, a larger range, and an ultrafine range, which allows optimization of the packing of the different particles, and optimization of the spacing coefficient of the skeleton by the binder;
- the presence, in addition to the cement, of non-cement binder materials belonging to the fine particle size range, which are in the majority relative to the cement and the choice and proportions of which are optimized;
- the use of ultrafine elements, in particular elements with pozzolanic reaction, capable of participating in the hydraulic binding function;
- the adjustment of water demand;
- the optimization of the different additives.

BRIEF DESCRIPTION OF THE FIGURES

FIG. 1a thus provides the profile of the materials used for example in the formulae CV1, CV2, CV7 or CV8 below; FIG. 1b provides that of the materials used for example in the formula CV3 below; FIG. 1c provides that of the materials used for example in the formulae CV4 or CV5 below; FIG. 1d provides that of the materials used for example in the formulae FC1, FC2 or FC3 below.

DESCRIPTION OF EMBODIMENTS OF THE INVENTION

Figure 1A:
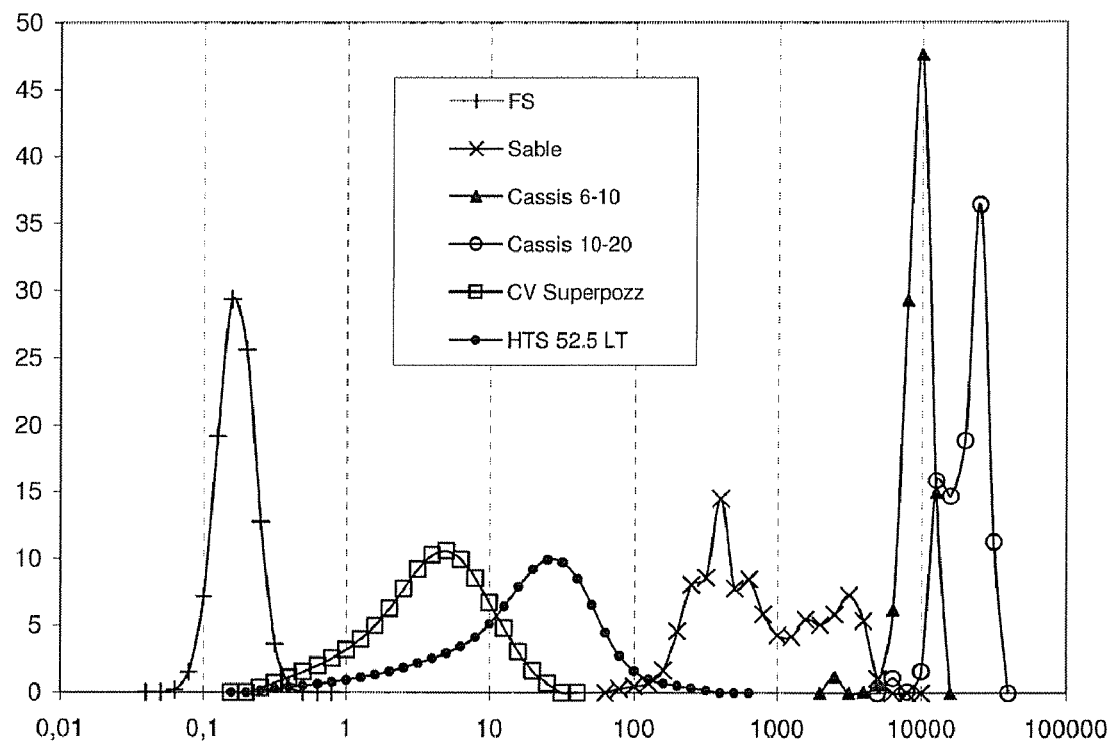
FIGS. 1a to 1d represent the particle-size distribution profiles of various materials used for preparing dry compositions according to the invention as well as associated mixed concretes. The size in μm is shown on the x-axis, and the percentage by volume on the y-axis. Reference can be made to the examples part for the meaning of the names of the materials.
Figure 1B:
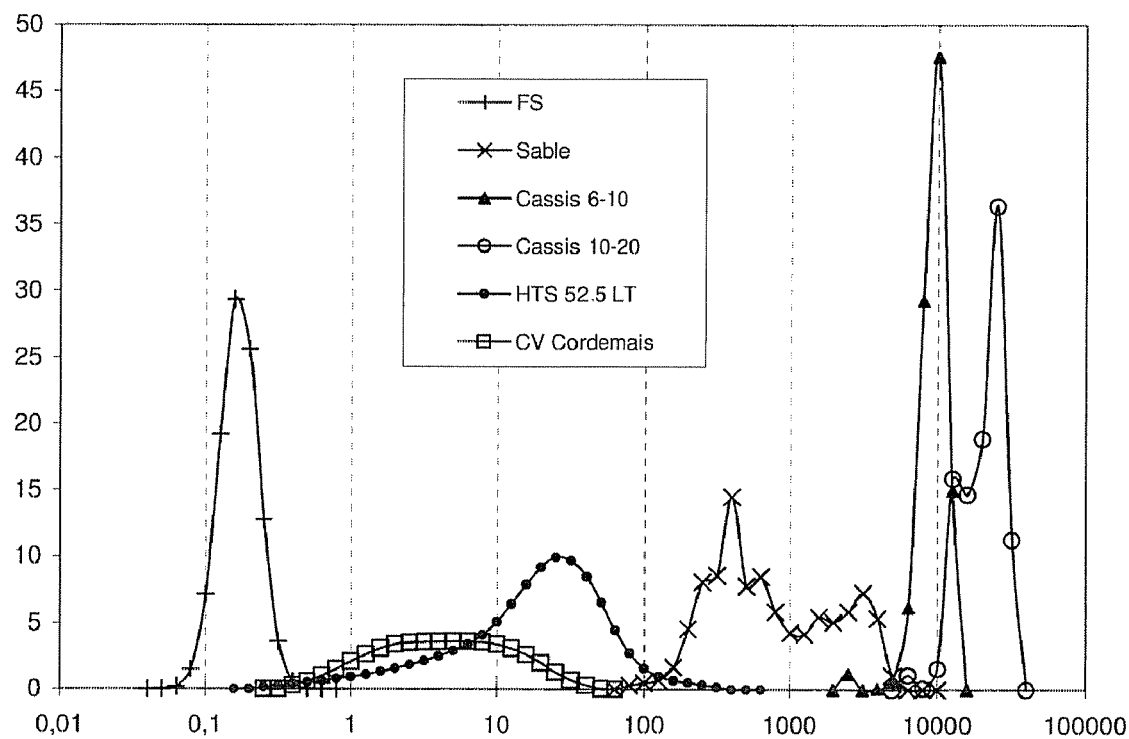
Figure 1C:
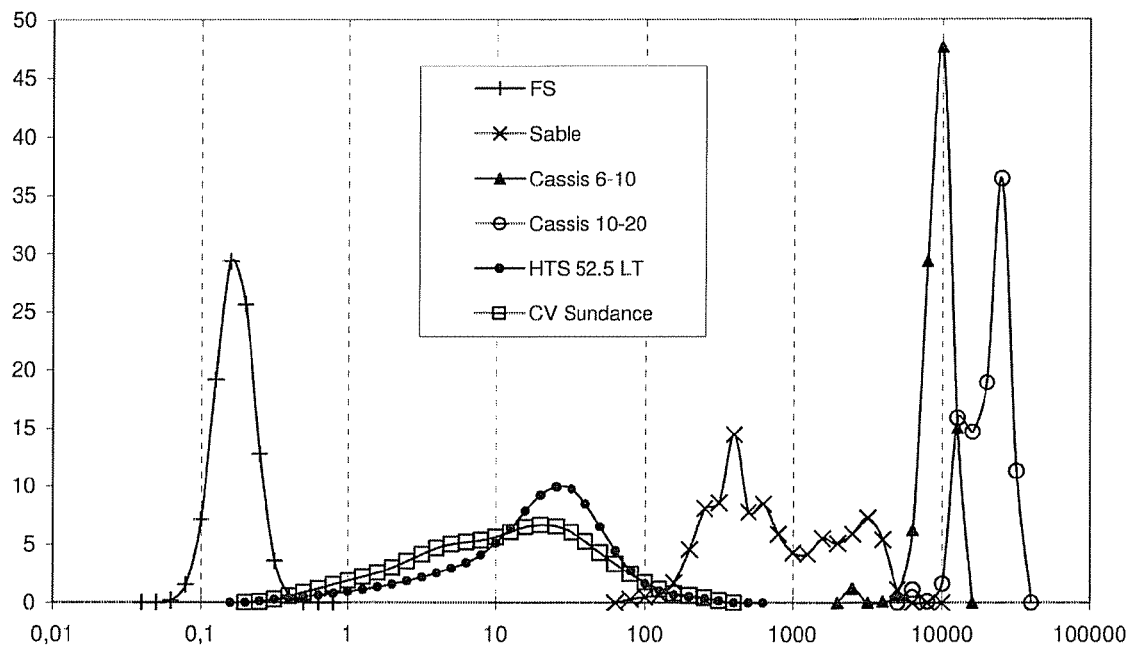
Figure 1D:
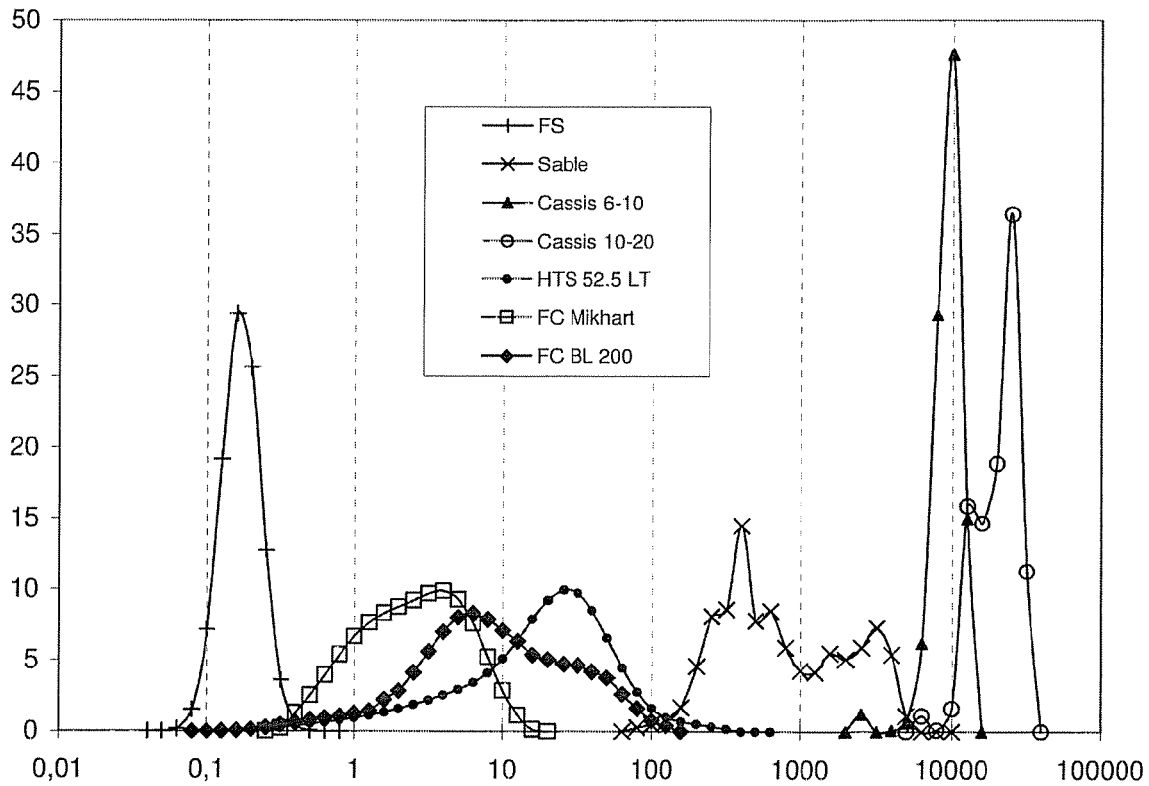

The invention will now be described in more detail without limitation in the following description.

Distribution of the Particle Size Ranges

The invention provides dry mortar compositions in the form of mixtures of various constituents, in the following proportions by mass:
- from 1 to 6%, preferably from 2 to 5% of Portland cement;
- from 0.4 to 4%, preferably from 0.8 to 1.7% of materials in the ultrafine particle size range;
- from 8 to 25%, preferably from 12 to 21%, of materials in the fine particle size range, different from cement;
- from 25 to 50%, preferably from 30 to 42%, of materials in the medium particle size range;
- from 25 to 55%, preferably from 35 to 47%, of materials in the larger particle size range.

The materials which make up the above mixture are present in the form of particles, i.e. unitary elements of materials. The particle-size distribution makes it possible to establish a division of the constituents into several "particle size ranges", i.e. into essentially separate compartments.

Thus, the ultrafine particle size range is made up of:
(i) particles with a D90 of less than 1 μm or
(ii) particles with a specific BET surface area greater than 6 $m^2/g$ or
(iii) particles with a D90 of less than 1 μm and with a specific BET surface area greater than 6 $m^2/g$.

The fine particle size range corresponds to a set of particles the D10 and the D90 of which are comprised between 1 μm and 100 μm and the specific BET surface area of which is less than 5 $m^2/g$. The medium particle size range corresponds to a set of particles the D10 and the D90 of which are comprised between 100 μm and 5 mm. And the larger particle size range corresponds to a set of particles the D10 of which is greater than 5 mm.

The D90 corresponds to the 90th percentile of the particle-size distribution, i.e. 90% of the particles are smaller than the D90 and 10% are larger than the D90. Similarly the D10 corresponds to the 10th percentile of the particle-size distribution, i.e. 10% of the particles have a size less than the D10 and 90% have a size greater than the D10.

The D10 and the D90 are the DV10 and the DV90 as is evident on the drawings.

In other words: at least 80% of the particles in the fine particle size range (preferably at least 90%, in a particularly preferred manner at least 95% or even at least 99%) have a size comprised between 1 μm and 100 μm; at least 80% of the particles in the medium particle size range (preferably at least 90%, in a particularly preferred manner at least 95% or even at least 99%) have a size comprised between 100 μm and 5 mm; at least 90% of the particles in the larger particle size range (preferably at least 95% or even at least 99%) have a size greater than 5 mm; and, according to the embodiments corresponding to cases (i) and (iii) above, at least 90% of the particles in the ultrafine particle size range (preferably at least 95%, in a particularly preferred manner at least 99%) have a size of less than 1 μm. The four particle size ranges (ultrafine, fine, medium and larger) then correspond to essentially separate size compartments.

The D10 or D90 of a set of particles can be generally determined by laser particle-size analysis for particles smaller than 200 μm, or by sieving for the particles larger than 200 μm.

Nevertheless, when the individual particles have a tendency to aggregate, their size should be determined by electron microscopy, given that the apparent size measured by laser diffraction particle-size analysis is then larger than the real particle size, which may falsify the interpretation.

The specific BET surface area is a measurement of the total real surface area of the particles which takes into account the presence of reliefs, irregularities, surface or internal cavities, and porosity.

According to an alternative embodiment, there can be an overlap between the sizes of the particles in the fine and ultrafine ranges, i.e. more than 10% of the particles in the ultrafine and fine ranges respectively can be situated in the same size range. In this case, the distinction between fine and ultrafine range is ensured by the specific BET surface area, the ultrafine particles being those which have the largest specific surface area (and therefore a high reactivity). In particular, in this case, the specific BET surface area of the materials in the ultrafine range is preferably greater than 10 $m^2/g$, advantageously greater than 30 $m^2/g$, and in a particularly preferred manner greater than 80 $m^2/g$. It should moreover be noted that the materials in the ultrafine range can also have these preferred specific BET surface area values even in the case where their D90 is less than 1 μm.

An example of a case where the ultrafine and fine ranges differ only by the specific BET surface area and not by the size of the particles can be that where the ultrafine particles are constituted by hydrated hydraulic binder grinds. In this example, the ultrafine particles can have a size of the order of 10 μm, for a specific surface area which can be of the order of 100 $m^2/g$ (due to the porosity of this material).

Another particular embodiment of the present invention envisages that it is possible to subdivide the mixture constituted by the cement and the fine particle size range into two particle size sub-ranges:

a first particle size sub-range, constituted by particles the D10 and D90 of which are comprised between 1 and 10 μm; and a second particle size sub-range, constituted by particles the D10 and D90 of which are comprised between 10 and 100 μm.

In this case, the cement belongs in particular to the first particle size sub-range.

In other words, according to this embodiment, at least 80% of the particles in the first particle size sub-range (preferably at least 90%, in a particularly preferred manner at least 95% or even at least 99%) have a size comprised between 1 and 10 μm, and at least 80% of the particles in the second particle size sub-range (preferably at least 90%, in a particularly preferred manner at least 95% or even at least 99%) have a size comprised between 10 and 100 μm. Still according to this embodiment, the mixture comprises 5 particle size ranges or 5 essentially separate compartments: the ultrafine range (less than 1 μm); the first sub-range of the cement+fine range mixture (1 μm-10 μm); the second sub-range of the cement+fine range mixture (10 μm-100 μm); the medium range (100 μm-5 mm); and the larger range (greater than 5 mm).

According to an alternative embodiment, the mixture constituted by the cement and the fine particle size range is constituted by particles the D10 and D90 of which are comprised between 1 and 20 μm. In other words, according to this embodiment, at least 80% of the particles of cement or of materials in the fine particle size range (preferably at least 90%, in a particularly preferred manner at least 95% or even at least 99%) have a size comprised between 1 and 20 μm. This embodiment corresponds to the case where the particle-size distribution profile comprises a discontinuity: the mixture comprises almost no particles with a diameter comprised between 20 and 100 μm.

The different embodiments described above correspond to optimized methods of packing grains or particles. The invention also provides, as described above, the binder premixes which correspond to these mixtures for dry mortars, and which contain no materials in the medium particle size range, nor materials in the larger particle size range. Said binder premixes are intended to be mixed with materials in the medium and larger particle size range before or at the time of the preparation of the concrete.

Preferably, the mixtures according to the invention are characterized by a spacing coefficient of the skeleton by the binder comprised between 0.5 and 1.3, preferably between 0.7 is 1.0. The "skeleton" designates the materials in the medium and larger particle size range, and the "binder" designates the cement as well as the materials in the fine and ultrafine particle size range. The "spacing coefficient" in question therefore designates the ratio of the volume of binder to the pore volume of the skeleton. This coefficient is calculated in particular from the vibrational porosity of the skeleton.

Choice of Materials

In the compositions as defined above, the cement is Portland cement chosen from the standard CPA-type (Artificial Portland Cement) Portland cements, and in particular from the cements described in European Standard EN 197-1. It is possible to use for example a CEM1 or CEM2 52.5 N or R or PM (for marine construction) cement or PMES (for marine construction, sulfated water). The cement can be of the HRI type (High Initial Strength). In some instances, notably for type CEM2, the Portland cement is not made of pure clinker but is provided admixed with at least one additional material (slag, silica fume, pozzolana, fly ash, calcinated schist, lime etc.) in an amount of up to 37%. In these instances, the abovementioned amounts of cement more particularly correspond to the clinker amounts, whereas the additional materials are counted among the relevant particle size range (e.g. typically the fine particle size range for the slag component, the ultrafine particle size range for the silica fume component etc.).

The larger particle size range can comprise aggregates and/or gravel and/or pebbles and/or stone chippings.

The medium particle size range can in particular comprise sand or fine sand.

The fine particle size range can comprise one or more materials chosen from fly ash, pozzolanas, limestone powders, siliceous powders, lime, calcium sulfate (in particular gypsum in anhydrous or semi-hydrated form), slag.

The word "fillers" is sometimes used to designate most of the above materials.

It is particularly useful to mix cement with the following products: fly ash alone; or limestone powder alone; or slag alone; or fly ash and limestone powder; or fly ash and slag; or limestone powder and slag; or fly ash, limestone powder and slag.

According to a variant, the fine particle size range comprises fly ash (optionally in association with yet other materials) but does not comprise any slag. According to an alternative variant, the fine particle size range comprises slag (optionally in association with yet other materials) but does not comprise any fly ash. Both variants limit the total $CO_2$ burden of the premix and mixture, since production of slag and fly ash is associated with $CO_2$ emissions. This advantage in terms of limitation of the $CO_2$ burden is particularly clear as far as the first variant is concerned.

The ultrafine particle size range can comprise materials chosen from the group consisting of silica fume, limestone powder, precipitated silica, precipitated carbonate, pyrogenated silica, natural pozzolan, pumice stone, ground fly ash, hydrated or carbonated siliceous hydraulic binder grind, and mixtures or co-grinds thereof, in dry form or aqueous suspension.

The term "hydrated siliceous hydraulic binder grinds" designates in particular the products described in the document FR 2708592.

Any standard plasticizer (or superplasticizer) can advantageously be added to a mixture or binder premix according to the invention, preferably at a concentration of 0.05 to 3%, preferably from 0.2 to 0.5%, expressed as a mass ratio of dry extract of the plasticizer to the mass of binder premix. The plasticizer can be used at saturation or not. The amount of plasticizer is also determined as a function of the desired quality of the paste, notably depending on whether a self-compacting concrete is desired or not. Slump measurements make it possible to determine the type and quantity of plasticizer that should be used in the formulation.

Other known additives or admixtures can also be used within the framework of the invention, for example superplasticizers, accelerators, air-entraining agents, thickening agents, retarders etc.

Concrete

The concrete according to the invention is prepared by mixing the above mixtures or the above binder premixes with water. In this case, the quantity of Portland cement that is used is advantageously less than 150 kg/m$^3$, preferably less than 120 kg/m$^3$, most preferably comprised between 60 and 105 kg/m$^3$. It can also be prepared by directly mixing the different ingredients with each other and with water, in the following proportions:

from 10 to 100 kg/m$^3$, preferably from 20 to 40 kg/m$^3$ of materials in the ultrafine particle size range;

from 25 to 150 kg/m$^3$, preferably from 50 to 120 kg/m$^3$ in a more particularly preferred manner, from 60 to 105 kg/m$^3$, of Portland cement;

from 200 to 600 kg/m$^3$, preferably from 300 to 500 kg/m$^3$ of materials in the fine particle size range;

from 600 to 1200 kg/m$^3$, preferably from 700 to 1000 kg/m$^3$ of materials in the medium particle size range;

from 600 to 1300 kg/m$^3$, preferably from 800 to 1100 kg/m$^3$ of materials in the larger particle size range; and optionally, a plasticizer.

By "kg/m$^3$" is meant the mass of materials to be used per m$^3$ of concrete product.

The materials in question, depending on the particular embodiments, have the same characteristics as those which have been described above in relation to the mixtures and binder premixes according to the invention.

The quantity of mixing water is reduced relative to a standard concrete, by from 60 to 180 l/m$^3$, preferably from 80 to 150 l/m$^3$, in a more particularly preferred manner from 95 to 135 l/m$^3$ of water. The W/B ratio, where W designates the quantity of water and B the quantity of binder (materials of the mixture (Portland cement+fine particle size range)), is therefore reduced relative to a standard concrete, and is typically situated between 0.1 and 0.45, preferably between 0.18 and 0.32. On the other hand, the W/C ratio, where W designates the quantity of water and C the quantity of cement, is greater than in the case of standard concrete, due to the small quantity of cement which is present. The W/C ratio is preferably comprised between 1 and 2.5, quite particularly between 1.3 and 1.5.

The mixing is carried out using a conventional mixer, for a mixing period which is usual in the field.

According to an embodiment, the concrete compositions formulated according to the invention are the result of a complex optimization of the different parameters involved (choice of materials and concentration thereof) in order to guarantee an optimized packing (choice of particle size and choice of admixtures), optimized hydration chemistry (in fact numerous components participate in the reaction: limestone powder, fly ash, silica fume etc.) and an optimized water demand.

The constituents of the ultrafine range, in particular silica fume, can in particular have multiple functions, namely a role filling in free spaces between particles, a role providing heterogeneous hydrate nucleation sites, a role adsorbing alkalines and calcium which are attracted by the surface silanol groups and a pozzolanic role.

The concrete compositions obtained according to the invention have comparable mechanical properties, preferably at least as good or even better relative to standard B25-type concretes, in particular in terms of compressive strength at 28 days, setting, shrinkage, and durability kinetics.

In particular, according to an embodiment of the invention, the compressive strength is greater than or equal to 4 MPa 16 hours after mixing, and greater than or equal to 25 MPa, preferably greater than or equal to 30 MPa, 28 days after mixing. Moreover, shrinkage at 80 days is advantageously less than 400 µm/m, preferably less than 200 µm/m.

Preferably, the concretes according to the invention are fluid or self-compacting concretes.

A concrete is considered to be fluid when the slump value measured using the Abrams cone (according to the French standard NF P 18-451, of December 1981) is at least 150 mm, preferably at least 180 mm. A concrete is considered to be self-compacting when the spreading value is greater than 650 mm for the concretes (and in general less than 800 mm) according to the procedure described in *Specification and Guidelines for Self Compacting Concrete*, EFNARC, February 2002, p. 19-23.

The quantity of cement used for preparing the concrete according to the invention is much less than that which is necessary for preparing a standard B25-type concrete, which makes it possible to make spectacular savings in terms of $CO_2$ emissions. Compared with a reference B25 formula which contains 95 kg/m$^3$ of limestone and 260 kg/m$^3$ of cement, a concrete according to the invention containing for example 70 kg/m$^3$ of clinker makes it possible to make savings in $CO_2$ emissions of approximately 80%. This saving can reach more than 85% if only 50 kg/m$^3$ of clinker is used.

The concrete according to the invention can be cast according to the usual methods; after hydration/hardening, hardened concrete objects are obtained, such as construction elements, engineering structural elements etc.

EXAMPLES

The following examples illustrate the invention without limiting it.

Example 1

Laser Granulometry Method

The particle size curves of the different powders are obtained using a Malvern MS2000 laser granulometer. The measurement is carried out wet (aqueous medium); the particle size must be comprised between 0.02 µm and 2 mm. The light source is provided by a red He—Ne laser (632 nm) and a blue diode (466 nm). The Fraunhofer optical model is used, the calculation matrix is of the polydisperse type.

A measurement of background noise is first carried out with a pump speed of 2000 rpm, a stirrer speed of 800 rpm and a noise measurement over 10 s, in the absence of ultrasound. Then it is verified that the light intensity of the laser is at least equal to 80%, and that a decreasing exponential curve for the background noise is obtained. Otherwise, the cell lenses must be cleaned.

A first measurement is then carried out on the sample with the following parameters: pump speed 2000 rpm, stirrer speed 800 rpm, absence of ultrasound, obscuration limit between 10 and 20%. The sample is introduced so as to have an obscuration slightly greater than 10%. After stabilisation of the obscuration, the measurement is carried out for a duration between immersion and measurement which is set at 10 s. The duration of the measurement is 30 s (30000 diffraction images analysed). In the particle size diagram obtained, it must be noted that a part of the population of powder can be agglomerated.

Then a second measurement is carried out with ultrasound (without emptying the tank). The pump speed is set at 2500 rpm, the stirring at 1000 rpm, ultrasound is emitted at 100% (30 watts). This regime is maintained for 3 minutes, then the initial parameters are returned to: pump speed 2000 rpm, stirrer speed 800 rpm, ultrasound absent. At the end of 10 s (to remove any air bubbles), a measurement is taken for 30 s (30000 images analysed). This second measurement corresponds to a powder deagglomerated by ultrasonic dispersion.

Each measurement is repeated at least twice to verify the stability of the results. The device is calibrated before each work session by means of a standard sample (Sifraco C10 silica) the size distribution curve of which is known. All the measurements given in the description and the ranges reported correspond to the values obtained with ultrasound.

Example 2

Method of Direct Visualization by Scanning Electron Microscopy

For powders with a strong tendency to agglomeration, the technique of direct visualization by scanning electron microscopy is used (with measurement and counting of the particles on the image obtained). Each powder sample is optionally dried by passing it through a drying cabinet at a temperature less than 50° C., or under vacuum or by lyophilization. Then two alternative methods for preparing the sample are used: preparation on adhesive tape for observing the powder overall (agglomeration effect, etc.) and preparation in suspension for individually characterizing the particles (size, shape, surface aspect, etc.)

In the preparation on adhesive tape, a metal block is taken and a double-sided self-adhesive conductive patch or double-sided self adhesive conductive tape is placed on its upper surface. Using a spatula, the powder to be examined is sprinkled on this surface, paying attention to the electrostatic effects during the sampling and sprinkling. The surface equipped with the double-sided adhesive can equally be applied to the powder to be examined. The excess powder not retained by the adhesive is removed by tapping the block, upper surface held vertical, on a hard surface. Optionally, the sample is lightly blown with a dry air spray to remove any particles which are insecurely fixed, and metallization is carried out.

A graphite block is used for preparing the suspension. It is cleaned with ethanol, the surface is polished with a polishing paste (for example PIKAL). Approximately 10 cm3 of the suspension liquid, in this case ethanol, is introduced into a beaker. The powder to be observed is added progressively, the beaker being placed in an ultrasonic tank (in order to obtain a low opacity suspension). Application of ultrasound is continued once introduction of the powder is complete. Then a few drops of the suspension are sampled and placed on the graphite block. The sampling is carried out using a micropipette or spatula. In order to avoid sedimentation phenomena, sampling is carried out as rapidly as possible, without stopping the stirring of the suspension. The liquid is then evaporated off, optionally by placing the block under an infra-red lamp. The film deposited must be very fine without showing any accumulation, it must be scarcely visible to the naked eye. Otherwise, the sample cannot be used. The excess powder insufficiently retained on the surface is removed by tapping the block, upper surface held vertical, on a hard surface. Optionally, the sample is lightly blown with a dry air spray to remove the particles which are insecurely fixed, and metallization is carried out.

Metallization is carried out by spraying a stream of molten metal (or carbon) under vacuum. The SEM measurement itself is carried out in a conventional manner known to a person skilled in the art.

Example 3

BET Specific Surface Area Measurement Method

The specific surface area of the different powders is measured as follows. A sample of powder of the following mass is taken: 0.1 to 0.2 g for an estimated specific surface area of more than 30 m2/g; 0.3 g for an estimated specific surface area of 10-30 m2/g; 1 g for an estimated specific surface area of 3-10 m2/g; 1.5 g for an estimated specific surface area of 2-3 m2/g; 2 g for an estimated specific surface area of 1.5-2 m2/g; 3 g for an estimated specific surface area of 1-1.5 m2/g.

A cell of 3 cm3 or 9 cm3 is used depending on the volume of the sample. The measurement cell assembly is weighed (cell+glass rod). Then the sample is added to the cell: the product must not be less than one millimeter from the top of the throat of the cell. The assembly is weighed (cell+glass rod+sample). The measurement cell is placed on a degassing unit and the sample is degassed. Degassing parameters are 30 min/45° C. for Portland cement, gypsum, pozzolanas; 3 h/200° C. for slag, silica fume, fly ash, high-alumina cement, limestone; and 4 h/300° C. for the alumina control. The cell is rapidly closed with a stopper after degassing. The assembly is weighed and the result noted. All weighing is carried out without the stopper. The mass of the sample is obtained by subtracting the mass of the cell from the mass of the cell+ degassed sample.

Analysis of the sample is then carried out after placing it on the measurement unit. The analyser is the Beckman Coulter SA 3100. Measurement is based on the adsorption of nitrogen by the sample at a given temperature, in this case the temperature of liquid nitrogen i.e. −196° C. The device measures the pressure of the reference cell in which the adsorbate is at its saturation vapour pressure and that of the sample cell in which known volumes of adsorbate are injected. The resulting curve of these measurements is the adsorption isotherm. In the measurement method, it is necessary to know the dead space volume of the cell: measurement of this volume is therefore carried out with helium before the analysis.

The sample mass previously calculated is entered as a parameter. The BET specific surface is determined by the software by linear regression from the experimental curve. The reproducibility standard deviation obtained from 10 measurements on a silica of specific surface area 21.4 m2/g is 0.07. The reproducibility standard deviation obtained from 10 measurements on a cement of specific surface area 0.9 m2/g is 0.02. A control is carried out every two weeks on a reference product. Twice-yearly, a control is carried out with the reference alumina supplied by the manufacturer.

Example 4

Raw Materials Used

In what follows, the following materials are more particularly used:
  larger particle size range: Cassis 10-20 aggregate and Cassis 6-10 aggregate (supplier Lafarge);
  medium particle size range: Honfleur sand (supplier Lafarge);
  cement: HTS CPA CEM1 52.5 PEMS Le Teil cement with 0.84 m³/g BET or St Pierre La Cour CPA CEM1 52.5 R cement with 0.89 m³/g BET (supplier Lafarge);
  fine particle size range: fly ash (also denoted CV hereafter) Sundance with 1.52 m²/g BET (supplier Lafarge), Superpozz with 1.96 m²/g BET (supplier Lafarge) or Cordemais with 4.14 m$^s$/g BET (supplier Surschiste); limestone powder (also denoted FC hereafter) Mikhart with 4.66 m³/g BET (supplier Provençale SA) or BL200 with 0.7 m²/g BET (supplier Omya);
  ultrafine particle size range: silica fume (also denoted FS hereafter) Elkem 971U with 21.52 m³/g BET.

The particle-size distribution profile of the materials used (as determined by laser particle-size analysis for particles with an average size of less than 200 μm and by video particle-size analysis for particles with an average size greater than 200 μm) is represented in FIGS. 1a to 1d and reveals the compartmentalization of the materials into separate particle size ranges.

In the examples which follow, an admixture, Prémia 180, is also used as plasticizer or superplasticizer.

Example 5

Concrete Formulations According to the Invention

Figure 2:
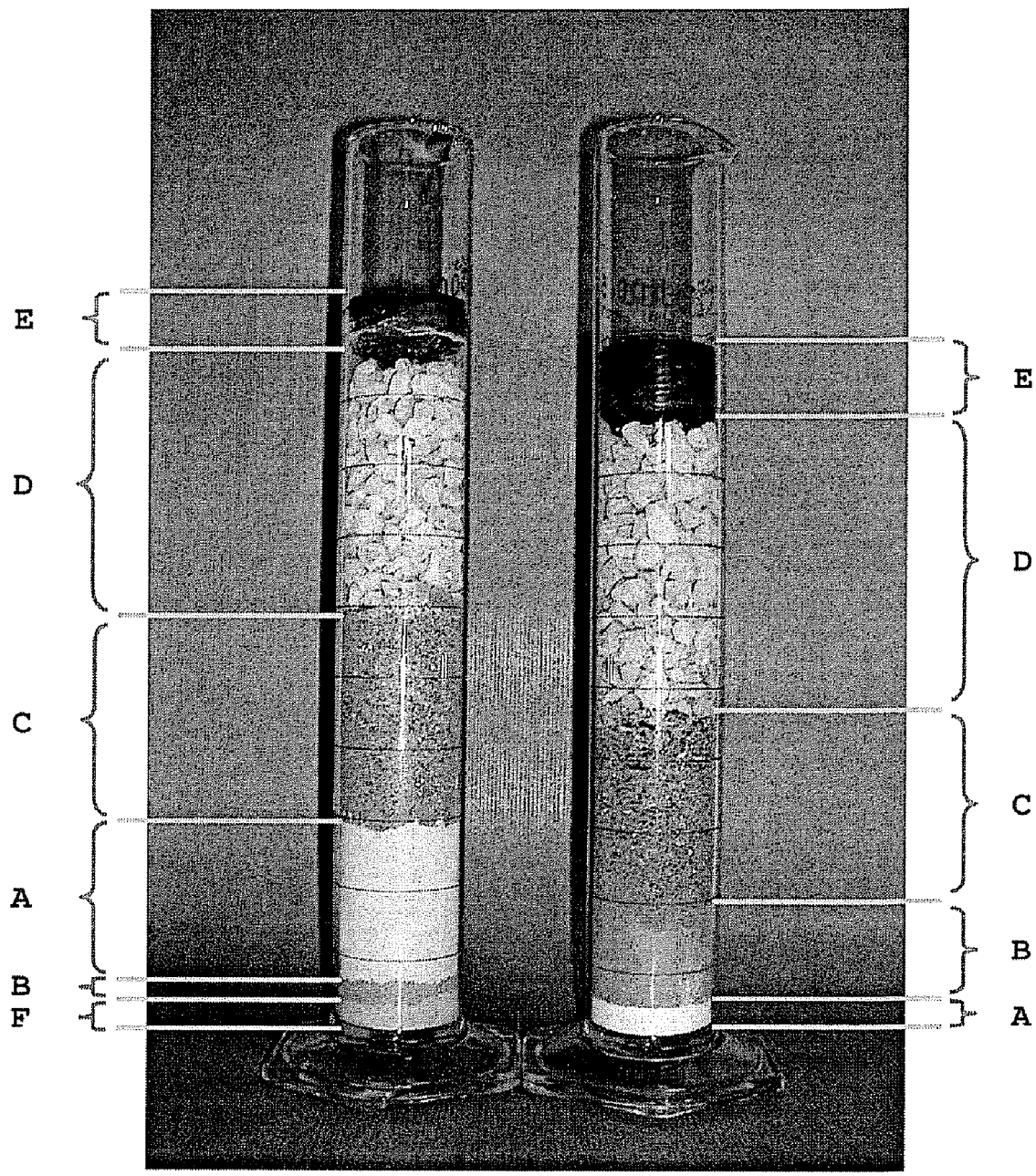
FIG. 2 is a photograph which provides a diagrammatic representation of a typical dry mortar composition according to the invention (on the left) compared with a standard B25-type dry mortar composition (on the right). The different constituents are the following: A, filler (limestone filler in the test piece on the right, fly ash in the test piece on the left); B, cement; C, sand; D, aggregate; E, water; F, silica fume.

The photograph in FIG. 2 provides a convenient diagrammatic visualization of a dry mortar according to the invention and a dry mortar of standard B25 type. It is noted that the proportion of cement is reduced by approximately 80% in the dry mortar according to the invention, and that the quantity of binder (cement, fine and ultrafine ranges) is approximately 40% greater in the dry mortar according to the invention, relative to the standard mortar. The quantity of water is reduced, and a new type appears, that of the ultrafine range.

The formulae which follow are formulae of concrete compositions according to the invention, based on fly ash. The materials used are those described in Example 4. Each number corresponds to the mass of material used (in kg) in order to prepare 1 m³ of concrete.

| Formula CV1 | | |
|---|---|---|
| Larger range | Cassis 6-10 | 953.70 |
| Medium range | Honfleur sand | 953.70 |
| Cement | HTS 52.5 LT | 74.20 |
| Fine range | CV Superpozz | 353.80 |
| Ultrafine range | FS Elkem 971U | 31.79 |
| Plasticizer | Prémia 180 | 6.00 |
| Water | | 100.00 |
| Formula CV2 | | |
| Larger range | Cassis 10-20 | 676.20 |
| | Cassis 6-10 | 350.22 |
| Medium range | Honfleur sand | 874.77 |
| Cement | HTS 52.5 LT | 72.21 |
| Fine range | CV Superpozz | 354.06 |
| Ultrafine range | FS Elkem 971U | 30.95 |
| Plasticizer | Prémia 180 | 4.54 |
| Water | | 100.00 |
| Formula CV3 | | |
| Larger range | Cassis 6-10 | 953.85 |
| Medium range | Honfleur sand | 953.85 |
| Cement | HTS 52.5 LT | 74.20 |
| Fine range | CV Cordemais | 374.95 |
| Ultrafine range | FS Elkem 971U | 31.79 |
| Plasticizer | Prémia 180 | 12.00 |
| Water | | 110.00 |
| Formula CV4 | | |
| Larger range | Cassis 6-10 | 953.70 |
| Medium range | Honfleur sand | 953.70 |
| Cement | HTS 52.5 LT | 74.20 |
| Fine range | CV Sundance | 296.00 |
| Ultrafine range | FS Elkem 971U | 31.80 |
| Plasticizer | Prémia 180 | 6.00 |
| Water | | 100.00 |
| Formula CV5 | | |
| Larger range | Cassis 10-20 | 663.15 |
| | Cassis 6-10 | 343.38 |
| Medium range | Honfleur sand | 857.93 |
| Cement | HTS 52.5 LT | 70.19 |
| Fine range | CV Sundance | 336.49 |
| Ultrafine range | FS Elkem 971U | 30.08 |
| Plasticizer | Prémia 180 | 6.00 |
| Water | | 100.00 |
| Formula CV6 | | |
| Larger range | Cassis 6-10 | 953.70 |
| Medium range | Honfleur sand | 953.70 |
| Cement | SPLC 52.5 R | 74.20 |
| Fine range | CV Superpozz | 353.80 |
| Ultrafine range | FS Elkem 971U | 31.79 |
| Plasticizer | Prémia 180 | 6.00 |
| Water | | 100.00 |
| Formula CV7 | | |
| Larger range | Cassis 6-10 | 953.70 |
| Medium range | Honfleur sand | 953.70 |
| Cement | HTS 52.5 LT | 73.50 |
| Fine range | CV Superpozz | 350.30 |
| Ultrafine range | FS Elkem 971U | 31.10 |
| Plasticizer | Prémia 180 | 10.00 |
| Water | | 103.50 |

-continued

| Formula CV8 | | |
|---|---|---|
| Larger range | Cassis 6-10 | 954.00 |
| Medium range | Honfleur sand | 954.00 |
| Cement | HTS 52.5 LT | 102.00 |
| Fine range | CV Superpozz | 329.00 |
| Ultrafine range | FS Elkem 971U | 32.00 |
| Plasticizer | Prémia 180 | 3.50 |
| Water | | 130.00 |

The following formulae are formulae of concrete compositions according to the invention, based on limestone powder or limestone filler.

| Formula FC1 | | |
|---|---|---|
| Larger range | Cassis 6-10 | 950.00 |
| Medium range | Honfleur sand | 950.00 |
| Cement | HTS 52.5 LT | 70.00 |
| Fine range | FC Mikhart 1 | 90.00 |
| | FC BL200 | 304.00 |
| Ultrafine range | FS Elkem 971U | 30.00 |
| Plasticizer | Prémia 180 | 8.00 |
| Water | | 100.00 |
| Formula FC2 | | |
| Larger range | Cassis 10-20 | 661.84 |
| | Cassis 6-10 | 342.54 |
| Medium range | Honfleur sand | 855.84 |
| Cement | HTS 52.5 LT | 70.02 |
| Fine range | FC Mikhart 1 | 100.03 |
| | FC BL200 | 336.78 |
| Ultrafine range | FS Elkem 971U | 30.01 |
| Plasticizer | Prémia 180 | 7.07 |
| Water | | 100.00 |
| Formula FC3 | | |
| Larger range | Cassis 10-20 | 661.84 |
| | Cassis 6-10 | 342.54 |
| Medium range | Honfleur sand | 855.82 |
| Cement | HTS 52.5 LT | 70.02 |
| Fine range | FC BL200 | 436.50 |
| Ultrafine range | FS Elkem 971U | 30.01 |
| Plasticizer | Prémia 180 | 7.07 |
| Water | | 100.00 |

Example 6

Performances of the Concretes According to the Invention

The performances of the concretes according to the invention are evaluated on the following points.

Compressive strength. This is measured by producing cylindrical test pieces with a diameter of 70, 110 or 160 mm and with a slenderness ratio of 2, rectifying the latter according to the standard NF P18-406, then loading them to failure. As regards the loading, the protocol involves surrounding each sample with two or three layers of cellophane band, centering it on the lower support of a press using a centering template (mechanical testing machine with a force-control capacity of 3000 kN, in accordance with the standards NF P18-411 and 412), to be configured for a force control of 1 MPa/s, carrying out the loading to failure according to the standard NF P18-406 and noting the value of the load at failure. The strength value is then derived by dividing the force by the section of the test piece.

Shrinkage. This is measured on test pieces produced in accordance with the standard NF P 196-1 using prismatic moulds with the dimensions 4×4×16 or 7×7×28 or 10×10×40 (in cm). Uniform drying is ensured by arranging the test pieces horizontally on two supports having a linear contact with the test pieces. Measuring markers in accordance with the standard NF P 15-433 are anchored in each test piece. The test pieces are removed from the moulds, then measurements are carried out using a retractometer (initially then at each chosen time). Throughout the period of the experiment, the location in which the test pieces are retained is maintained at a temperature of 20° C.±2° C. and at a relative humidity of 50%±5%.

Durability (measurement of water porosity and gas permeability). The latter is evaluated according to the AFGC or Association Française de Genie Civil [French Association of Civil Engineering] test (see Document Scientifique et Technique, 2004: "Conception des bétons pour une duration de vie donnée des ouvrages").

These performances are compared in what follows to those of a standard B25 concrete (control) of the following composition:

| Cassis 10-20 Aggregate | 655.00 kg/m³ |
|---|---|
| Cassis 6-10 Aggregate | 339.00 kg/m³ |
| Honfleur Sand 0-4 | 847.00 kg/m³ |
| SPLC CEMI 52.5 Cement | 237.00 kg/m³ |
| MEAC BL 200 Filler | 95.00 kg/m³ |
| Chrysoplast 209 Admixture | 0.77 kg/m³ |
| Water | 164.00 kg/m³ |

It should be noted that the concrete chosen as a control has exceptionally high performances compared with the standard B25. A concrete which has slightly lower performances than those of this control can also be judged entirely satisfactory just the same.

The result of the compressive strength measurements is shown in Table 1 below: it shows in particular that numerous formulations among those of Example 5 make it possible to obtain a compressive strength greater than or equal to 4 MPa at 16 hours and greater than or equal to 25 or even 30 MPa at 28 days.

Table 1—Compressive Strength (in MPa) Up to 28 Days

| | Time: 16 hours | Time: 24 hours | Time: 28 days |
|---|---|---|---|
| Control | 10.3 | 15.2 | 43 |
| CV1 (1) | 3.83 | 6.00 | 34.37 |
| CV2 (2) | | 6.03 | 36.75 |
| CV3 (1) | | 3.79 | |
| CV5 (2) | | 4.1 | 39.03 |
| CV6 (1) | 5.61 | 8.13 | |
| FC1 (1) | 4.89 | 6.28 | |
| FC2 (2) | | 8.30 | 43.10 |
| FC3 (2) | 4.67 | 6.63 | 38.07 |

(1): experiment carried out on a test piece 70 mm in diameter, for a slenderness ratio factor of 2;
(2): experiment carried out on a test piece 110 mm in diameter, for a slenderness ratio factor of 2.

The control is tested on a test piece 110 mm in diameter, for a slenderness ratio factor of 2.

Another separate experiment is carried out on another batch of cement, in order to monitor the compressive strength of certain samples over the longer term. The results are shown in Table 2, and indicate that, over the period, certain formulae acquire a mechanical strength similar to that of very good quality B25 concrete, or even better.

TABLE 2

| compressive strength (in MPa) up to a time limit of 4 months | | | | |
|---|---|---|---|---|
| | 1 month | 2 months | 3 months | 4 months |
| Control | 36.8 | 39.8 | 45.1 | 46.1 |
| CV2 | 32 | 44.9 | 49 | 53.9 |
| FC3 | 32 | 39.8 | 45.1 | 44.8 |

Figure 3:
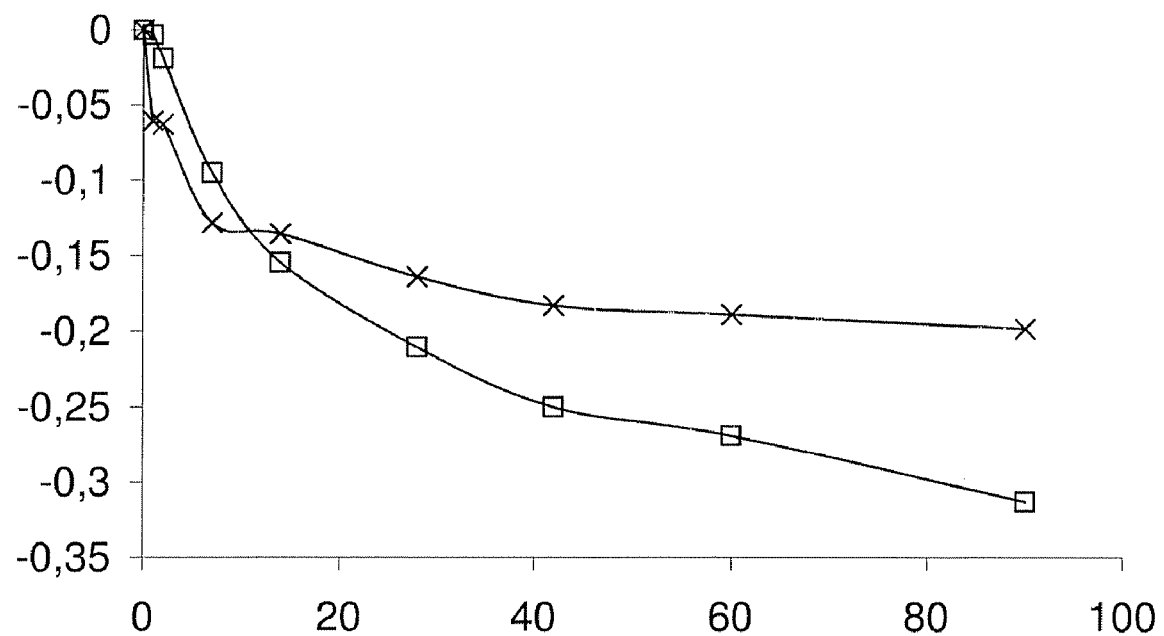
FIG. 3 represents the shrinkage measured on a concrete according to the invention (x) compared with a control standard B25 concrete (□). The time, in days, is shown on the x-axis and the dimensional variation of the concrete, as a %, on the y-axis.

The experiment comparing the shrinkage of a concrete according to the invention with that of a control B25 concrete has led to the results which are compiled in FIG. 3. The formula CV2 (x) is characterized by less shrinkage beyond two weeks in comparison with a standard formula. Also, a concrete of this type appears to be suited to horizontal applications or to large constructions.

As regards the durability study, the physical properties of the concretes formulated according to the invention are more favorable than those of a standard B25 concrete, due to lower water porosity (approximately 10%, respectively 8%, for a concrete of formula CV2, vs. approximately 17%, respectively 14%, for a standard B25 concrete, one day, respectively 28 days, after mixing) and lower gas permeability (approximately $5 \times 10^{-16}$ m$^2$ for a concrete of formula CV2 vs. $1 \times 10^{-10}$ m$^2$ for a standard B25 concrete, 28 days after mixing). Corrosion tests also show that the behavior is improved relative to a normal B25 concrete.

The invention claimed is:

1. A mixture comprising in proportions by mass:
   from 0.4 to 4% of one or more materials in the ultrafine particle size range, constituted by particles with a D90 smaller than 1 μm and/or with a specific BET surface area greater than 6 m$^2$/g;
   from 1 to 6% of Portland cement;
   from 8 to 25% of one or more materials in the fine particle size range, constituted by particles the D10 and the D90 of which are comprised between 1 μm and 100 μm and with a specific BET surface area of less than 5 m$^2$/g, different from cement;
   from 25 to 50% of one or more materials in the medium particle size range, constituted by particles the D10 and the D90 of which are comprised between 100 μm and 5 mm; and
   from 25 to 55% of one or more materials in the larger particle size range, constituted by particles the D10 of which is greater than 5 mm,
   wherein the ultrafine particle size range is constituted by one or more materials selected from the group consisting of silica fume, limestone powder, precipitated silica, precipitated carbonate, pyrogenated silica, natural pozzolan, pumice stone, ground fly ash, hydrated or carbonated siliceous hydraulic binder grind, and mixtures or co-grinds thereof, in dry form or aqueous suspension.

2. A binder premix comprising:
   Portland cement;
   a fine particle size range as defined in claim 1; and
   an ultrafine particle size range as defined in claim 1; in which the proportion by mass of Portland cement in the premix is less than 50%.

3. A binder premix according to claim 2, comprising in proportions by mass:
   from 5 to 35% of Portland cement;
   from 60 to 90% of one or more materials in the fine particle size range, and
   from 2 to 20% of one or more materials in the ultrafine particle size range.

4. A mixture according to claim 1, in which the fine particle size range comprises one or more materials selected from the group consisting of fly ash, pozzolan, limestone powder, siliceous powder, lime, calcium sulfate, slag.

5. A mixture comprising:
   a binder premix according to claim 2;
   from 25 to 50% of one or more materials in the medium particle size range constituted by particles the D10 and the D90 of which are comprised between 100 μm and 5 mm; and
   from 25 to 55% of one or more materials in the larger particle size range constituted by particles the D10 of which is greater than 5 mm.

6. A wet concrete composition, comprising:
   a mixture according to claim 1, mixed with
   water.

7. A wet concrete composition comprising:
   from 10 to 100 kg/m$^3$ of one or more materials in the ultrafine particle size range as defined in claim 1;
   from 25 to 150 kg/m$^3$ of Portland cement;
   from 200 to 600 kg/m$^3$ of one or more materials in the fine particle size range as defined in claim 1;
   from 600 to 1200 kg/m$^3$ of one or more materials in the medium particle size range as defined in claim 1;
   from 600 to 1300 kg/m$^3$ of one or more materials in the larger particle size range as defined in claim 1; and
   optionally, a plasticizer.

8. A wet concrete composition according to claim 7, wherein the W/C ratio, where W designates the quantity of water and C the quantity of Portland cement, is comprised between 1 and 2.5.

9. A wet concrete composition according to claim 7, in which the W/B ratio, where W designates the quantity of water and B the quantity of materials in the mixture which is Portland cement and fine particle size range particles, is comprised between 0.1 and 0.45.

10. A wet concrete composition according to claim 7, comprising from 60 to 180 l/m$^3$ of water.

11. A wet concrete composition according to claim 7, which is a self-compacting concrete.

12. A concrete composition obtained from a wet concrete composition according to claim 7, comprising less than 150 kg/m$^3$ of Portland cement and having a compressive strength greater than or equal to 4 MPa 16 hours after mixing, and greater than or equal to 25 MPa 28 days after mixing.

13. A method for the preparation of a wet concrete composition comprising:
   mixing the mixture of claim 1 with water.

14. A method for the preparation of a wet concrete composition comprising:
   mixing the binder premix as defined in claim 2 with from 25 to 50% of one or more materials in the medium particle size range, constituted by particles the D10 and the D90 of which are comprised between 100 μm and 5 mm from 25 to 55% of one or more materials in the larger particle size range, constituted by particles the D10 of which is greater than 5 mm and water.

15. A method for the preparation of a wet concrete composition comprising mixing:
   from 10 to 100 kg/m$^3$ of one or more materials in the ultrafine particle size range as defined in claim 1;
   from 25 to 150 kg/m$^3$ of Portland cement;
   from 200 to 600 kg/m$^3$ of one or more materials in the fine particle size range as defined in claim 1;

from 600 to 1200 kg/m³ of one or more materials in the medium particle size range as defined in claim 1;

from 600 to 1300 kg/m³ of one or more materials in the larger particle size range as defined in claim 1; and optionally, a plasticizer and/or an accelerator and/or an air-entraining agent and/or a thickening agent and/or a retarder; with water.

16. A method for the preparation of a cast wet concrete, comprising:

casting the wet concrete composition according to claim 7.

17. A method for the production of a concrete object, comprising:

hardening the wet concrete composition according to claim 7.

\* \* \* \* \*